United States Patent
Xie et al.

(10) Patent No.: US 7,347,237 B2
(45) Date of Patent: Mar. 25, 2008

(54) RUBBER COMPOSITION CONTAINING RESINOUS NANOPARTICLE

(75) Inventors: Feng Anne Xie, San Jose, CA (US); Lei Zheng, Apex, NC (US); Eric Sean Castner, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 271 days.

(21) Appl. No.: 11/364,162

(22) Filed: Feb. 28, 2006

(65) Prior Publication Data

US 2006/0148931 A1 Jul. 6, 2006

Related U.S. Application Data

(63) Continuation-in-part of application No. 10/823,256, filed on Apr. 13, 2004, now Pat. No. 7,071,246.

(51) Int. Cl.
*B60C 5/00* (2006.01)
(52) U.S. Cl. .................... 152/209.1; 152/450
(58) Field of Classification Search ............ 152/209.1, 152/450
See application file for complete search history.

(56) References Cited

U.S. PATENT DOCUMENTS

| | | | |
|---|---|---|---|
| 5,306,743 A | 4/1994 | Klesse et al. | 523/201 |
| 6,127,488 A | 10/2000 | Obrecht et al. | 525/333.3 |
| 6,469,101 B2 | 10/2002 | Nahmias et al. | 525/132 |
| 6,777,500 B2 * | 8/2004 | Lean et al. | 525/316 |
| 6,780,937 B2 * | 8/2004 | Castner | 525/193 |
| 7,071,246 B2 * | 7/2006 | Xie et al. | 523/201 |
| 2004/0127603 A1 * | 7/2004 | Lean et al. | 523/201 |

FOREIGN PATENT DOCUMENTS

JP 2002080642 3/2002

* cited by examiner

*Primary Examiner*—Jeffrey Mullis
(74) *Attorney, Agent, or Firm*—Alvin T. Rockhill

(57) ABSTRACT

This invention relates to a tread rubber composition for tires with the addition of crosslinked resinous nanoparticles having a high glass transition temperature ($T_g$) into elastomeric base polymers. The invention demonstrates greatly improved handling performance without deteriorating controllability and stability during high-speed running. The present invention more specifically discloses a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; and wherein the tread is comprised of a rubber composition comprising: (1) a rubbery polymer; (2) from 1 to 30 parts per hundred parts of rubber by weight of pre-crosslinked polymer particles, wherein the pre-crosslinked polymer particles have a mean number average particle size as determined by light scattering which is within the range of 30 nm to 500 nm, wherein the pre-crosslinked polymer is comprised of repeat units that are derived from at least one monomer selected from the group consisting of acrylate monomers, acrylonitrile monomer, and vinyl halide monomers, wherein the pre-croslinked polymer is in the form of core-shell particles having a core and a shell, and wherein the pre-crosslinked polymer has a glass transition temperature which is within the range of 30° C. to 200° C.; and (3) 10 to 150 parts per hundred parts of rubber by weight of at least one filler selected from the group consisting of carbon black and silica.

20 Claims, 2 Drawing Sheets

RUBBER COMPOSITION CONTAINING RESINOUS NANOPARTICLE

This is a continuation-in-part application of U.S. patent application Ser. No. 10/823,256, filed on Apr. 13, 2004 now U.S. Pat No. 7,071,246. The teachings of U.S. patent application Ser. No. 10/823,256 are incorporated herein by reference in their entirety.

BACKGROUND OF THE INVENTION

There has been an increasing demand to develop tires with a high level of handling performance, good stability and steering response when changing lanes, avoiding obstacles on the road and cornering. Improved road grip without compromising stability is critical for vehicles traveling at high speed. However, higher tire operating temperatures are encountered at high speeds than are experienced during normal driving and the hot rubber in the tire becomes more pliable which reduces the handling stability of the tire, a so-called "borderline" use of said tire.

A widely adopted method to improve stability, particularly road gripping properties, is to increase the hysteresis loss of tread rubber compositions. A large hysteresis loss during the deformation of tread is used for increasing a friction force between the tread and road surface. However, a significant increase of heat buildup will occur during the running of the tires as the hysteresis loss of the tread rubber becomes large, causing wear resistance of the tread rubber to deteriorate rapidly. On the other hand, it is believed that controllability is significantly influenced by hardness (which is closely related to cornering stiffness of a tire) and breaking strength of rubber compositions. In order to enhance controllability, especially steering response, it is necessary to increase the stiffness of the tire compound in general and the tread in particular, which in most cases results in lower hysteresis loss. Therefore, it is very difficult to achieve both of these desired properties by conventional compounding techniques.

In the past, various attempts have been made to improve driving performance by adding a large amount of a softener or a plasticizer to a rubber composition, or increasing the amount of carbon black, employing carbon black with high surface area, or increasing the amount of sulfur. However, none of these methods are successful in achieving desirable driving characteristics without deteriorating abrasion resistance, especially when running at high speed. Tread rubber compounds containing large amounts of a softener show improved driving performance at low temperatures. However, the inclusion of high levels of softeners results in reduced wear resistance and poor processability. The introduction of a large amount of carbon black with high surface area increases the difficulty of filler dispersion in rubber compounds. Furthermore, increasing the amount of sulfur results in reduced hysteretic loss, but leads to poor traction characteristics.

Rubber compositions containing styrene-butadiene copolymer rubber (SBR) with a high content of bound styrene have been used in tread compositions to increase hysteresis loss. However, such rubber compositions can be inadequate in elastic modulus, especially at high temperatures. Accordingly, polystyrene resins, styrene-butadiene block copolymers, and other hydrocarbon resins have added to such rubber compositions for the purpose of increasing elastic modulus (see U.S. Pat. No. 4,487,892; Japanese Patent No. 5,009,338; European Patent No. 0,117,834A1 and European Patent No. 0,470,693A2). However, the aforementioned materials are essentially soluble in SBR base compositions and act as softeners at elevated temperatures. This results in the hardness and dynamic storage modulus decreasing after substantial heat buildup during high-speed running, which in turn lead to poor controllability and reduced wear resistance.

U.S. Pat. No. 6,469,101 discloses a vulcanizable rubber composition comprising (a) cross-linkable unsaturated chain polymeric base, and (b) from 2 to 30 parts by weight of the polymeric base of at least one polymeric organic compound solid at room temperature and having a glass transition temperature of from 80 to 160° C. and an average molecular weight of from 10,000 to 1,000,000, said polymeric organic compound being substantially insoluble in said polymeric base, wherein the rubber composition has, once vulcanized, a first hysteretic behavior at a first working temperature of a tire having a thread made of the composition and a second hysteretic behavior, which differs from the first hysteretic behavior, at a second working temperature of the tire. The benefits of the incorporation of these organic substances are improved low rolling resistance at 40-70° C. and a high hysteresis loss above 70° C. However, it has been found that the significant increase of hysteresis loss due to phase transition of the included organic substances generates high heat buildup as well. In addition, the spike of hysteresis loss can result in a dramatic change in driving performance and reduced handling performance which is commonly known as "give-up". Without wishing to be bound by any particular theory, it is believed that the nature of the claimed materials determines that they are unable to maintain the integrity of the phase domains formed while the tread is under high thermomechanical stress. The fusion and flowing of the domains occurs during phase transition, resulting in degradation of controllability. Therefore, the method disclosed to improve controllability and stability is not effective to achieve the total objective being sought.

U.S. Pat. No. 6,127,488 discloses that rubber mixtures prepared from at least one styrene/butadiene rubber gel and at least one rubber which contains double bonds and optionally further fillers and rubber auxiliary substances are in particular suitable for the preparation of vulcanizates having unusually high damping at temperatures of from −20 to +20° C. as well as unusually low damping at temperatures of from 40 to 80° C. The rubber mixtures may therefore be used, for example, to manufacture vehicle tires which grip wet road surfaces and have low rolling resistance.

Japanese Patent No. 2002080642 discloses the inclusion of uncrosslinked or crosslinked polyacrylate or polymethyl methacrylate particles with a mean particle diameter of 1-200 micrometers in tread rubber compositions. The benefits touted as being obtained are improved wet traction, better wear resistance and low heat buildup, without degrading dry traction. Japanese Patent No. 2002080642 also disclosed that particles smaller than 1 micrometer are insufficient to reduce hysteresis loss.

On the other hand, nanoparticles are currently receiving significant interest in rubber compositions. They often provide unique physical properties that differ from those of the bulk material. The higher surface to volume ratio of the nanoparticles provides a better opportunity for chemical and physical interactions with the polymer matrix.

The technical problem underlying the present invention is to provide a solution for obtaining a balance between improved controllability, particularly road grip, and good stability for better overall handling performances at high running speed. As previously mentioned, the hysteretic loss of the tread rubber should be large to obtain high gripping force (traction characteristics) between the tread and road surface. High-speed handling performance closely correlates to the stability of the hysteresis loss. Generally, the addition of high $T_g$ material to boost hysteresis loss at high temperature ranges fails to maintain the stability, as the hysteresis loss undergoes sudden change with the phase transition.

SUMMARY OF THE INVENTION

This invention relates to a tread rubber composition for tires with the addition of crosslinked resinous nanoparticles having a high glass transition temperature ($T_g$) into elastomeric base polymers. The invention demonstrates greatly improved handling performance without deteriorating controllability and stability during high-speed running.

This invention further relates to tire tread rubber compositions which simultaneously satisfy requirements of both high durable performance in high-speed running and large gripping force. This invention is based upon the finding that when high $T_g$ particles with an internally crosslinked structure are incorporated into a rubber that they form domains without being fused and flowing under high thermomechanical stresses experienced during high speed operations, so that driving stability is maintained. It has also been found that since the high $T_g$ particles soften over a high temperature range, high grip in "borderline working conditions" can also be achieved due to the increase of hysteresis loss.

The tire tread compositions according to the present invention are characterized in that a rubber component composed mainly of a diene based rubber or natural rubber is compounded with at least one type of high $T_g$ particle internally-crosslinked. Furthermore, the rubber compounds of this invention show tensile stress at 300% elongation of not lower than 80% of the value of the same composition without the crosslinked particles at 100° C.

The internally crosslinked particles utilized in accordance with this invention are not limited to a specific crosslinked structure or manner of crosslinking. The particles are synthesized by emulsion polymerization which can be a batch, semi-batch, or continuous process, but which provides excellent control of the polymer composition and morphology. The resinous particles according to this invention includes homopolymers, or copolymers obtained by polymerization of two or more monomers, or structures of a crosslinked particle center made of homopolymers, or copolymers, grafted with polymer brushes or polymer layers, for example, a core-shell morphology. The crosslinked particles should have a $T_g$ above 30° C. depending on the service temperature range requiring stable handling performances for the specific desired application. The composition of the particle should be tailored from a solubility standpoint to have an appropriate degree of compatibility with the base polymer, so that the magnitude of hysteresis loss can be maximized while the change of hysteresis loss can be minimized at the service temperature range. In addition, the particle should have a mean particle diameter within the range of 30 nm to 500 nm.

The present invention more specifically discloses a rubber composition comprising: (1) a rubbery polymer and (2) from 1 phr to 30 phr of a pre-crosslinked polymer, wherein the pre-crosslinked polymer is in the form of particles having a particle size which is within the range of 30 nm to 500 nm, wherein the pre-crosslinked polymer is comprised of repeat units that are derived from at least one monomer selected from the group consisting of acrylate monomers, vinyl aromatic monomers, acrylonitrile monomer, and vinyl halide monomers, and wherein the pre-crosslinked polymer has a glass transition temperature which is within the range of 30° C. to 200° C.

The subject invention further reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; and wherein the tread is comprised of a rubber composition comprising: (1) a rubbery polymer; (2) from 1 to 30 parts per hundred parts of rubber by weight of pre-crosslinked polymer particles, wherein the pre-crosslinked polymer particles have a mean number average particle size as determined by light scattering which is within the range of 30 nm to 500 nm, wherein the pre-crosslinked polymer is comprised of repeat units that are derived from at least one monomer selected from the group consisting of acrylate monomers, acrylonitrile monomer, and vinyl halide monomers, wherein the pre-croslinked polymer is in the form of core-shell particles having a core and a shell, and wherein the pre-crosslinked polymer has a glass transition temperature which is within the range of 30° C. to 200° C.; and (3) 10 to 150 parts per hundred parts of rubber by weight of at least one filler selected from the group consisting of carbon black and silica.

DETAILED DESCRIPTION OF THE INVENTION

Figure 1:
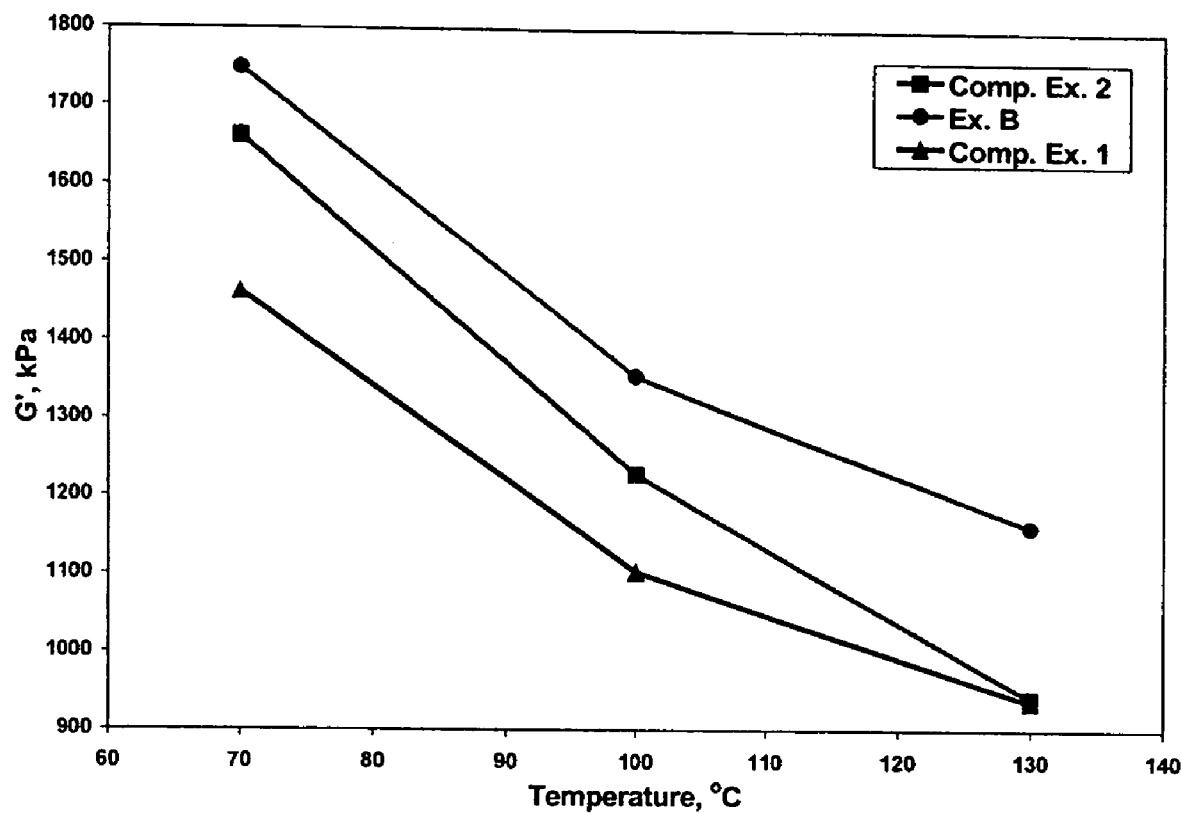
FIG. 1 compares the values of elastic modulus (G') at 5% strain, which were determined by experimental methods known per se and using apparatuses marketed by Rheometrics, as a function of the temperature for a preferred rubber composition of this invention with two other comparative rubber compositions.

In the following description and in the subsequent claims, the term glass transition temperature ($T_g$) is used to indicate the temperature above which the macromolecular chains of the polymer are capable of deforming, changing their conformation through heat-activated jumps, and under which the movement of the various segments of such macromolecular chains is substantially barred. Generally, $T_g$ can be measured by DSC (differential scanning calorimetry). It can also be obtained from the tanδ curve, tanδ defined as: tanδ=G"/G', as a function of temperature collected by the commercially available dynamic mechanical thermal analysis equipment, for instance a Rheometric Scientific Solid Analyser (RSA). The temperatures where the peaks of the tanδ curve occur correspond to the $T_g$s of the components in the material tested.

In the following description and in the subsequent claims, loss compliance (J") of a vulcanized rubber compound, measured by rheometrics with a temperature sweep from −50° C. to +150° C., is used as the indicator of overall handling performance (see J. M. Funt, Rubber World, 194(3) June 1986). As mentioned above, a generally recognized way to increase hysteresis loss is to introduce a high $T_g$ material that undergoes transition over a high temperature range failing to maintain stability performance, showing a spike in the J" curve, which is known to drivers as "give up" performance. Therefore, a constant high J" value over the service temperature range is indicative of good stability performance.

It has been found that when a pre-crosslinked particle (the particle is crosslinked during its synthesis and prior to being mixed into the rubbery polymer) with a high $T_g$ is incorporated in a base polymer for tread compounds, the resulting rubber composition acquires high grip when the tread temperature exceeds normal operating temperatures during high-speed running. At the same time, without wishing to be bound by any particular theory, the crosslinked structure of the particle ensures that it retains its original dispersion state in the rubber compound under high thermomechanical stresses during high-speed running and cornering, while the stability breaks down due to fusion of domains if uncrosslinked particles or linear polymers are used. Under this theory, by optimizing the degree of compatibility of the particle with the base polymer, the sudden change of hysteresis loss around the glass transition temperature is moderated, and the driving stability is maintained consequently. As a result, by appropriately selecting the ingredients of the rubber composition, it is possible to achieve high grip, improved controllability and driving stability simultaneously when the operating temperature increases above that which is normally encountered during high-speed running.

The rubber compositions according to this invention are comprised of 1 to 30 parts by weight of a crosslinked resinous particle having a $T_g$ of not less than 30° C. per 100 parts by weight of at least one rubber selected from synthetic polydiene rubbers and natural rubber.

The crosslinked resinous particle according to this invention includes homopolymers selected from the group consisting of polymethyl-methacrylate, polybutyl-acrylate, polyethyl-methacrylate, polyacrylic acid, polymethyl-methacrylic acid, polyacrylonitrile, polymethacrylonitrile, polystyrene, polymethylstyrene, polyvinylalcohol and the like, and copolymers obtained by polymerization of two or more monomers constituting the above homopolymers or by polymerization of at least two of the monomers constituting the above homopolymers and other monomers. Some representative examples of pre-crosslinked polymers that can be used include ethyl-methacrylate/methyl-methacrylate copolymers, butyl-acrylate/methyl-methacrylate copolymers, butyl-acrylate/ethyl-methacrylate copolymers, acrylonitrile-butadiene-styrene (ABS) terpolymers and mixtures thereof.

The structure of the particle can be spherical particles solely made from the aforementioned homopolymers or copolymers, or particles of a crosslinked core made from the aforementioned homopolymers or copolymers grafted with the aforementioned homopolymers or copolymers, or particles of a crosslinked core covered by crosslinked or uncrosslinked layers of homopolymers or copolymers, covalently bonded or not connected with the core. It has been discovered that particles with core-shell structures could provide extra control over structure, size, and morphology that are very useful. The shells on the particles can be used to control interface properties and to make the particle compatible or incompatible with a rubber matrix. For example, if the shells are miscible with the polymer matrix, or host polymer, the particles can be ultimately dispersed. If the shells are incompatible with the matrix, the particles can aggregate and form higher ordered structure.

The particle will have a mean diameter of well less than 1 micron. The pre-crosslinked polymer particles will typically have a mean number average particle size as determined by light scattering which is within the range of 30 nm to 500 nm and will preferably have a mean number average particle size as determined by light scattering within the range of 40 nm to 250 nm. The pre-crosslinked polymer particles will most preferably have a mean number average particle size as determined by light scattering which is within the range of 100 nm to 200 nm. Particles of such size range may be dispersed homogeneously in the base polymer. The strong physical interaction between the particles and base polymer helps maintain the mechanical properties of the rubber composition. Because the pre-crosslinked polymer is substantially crosslinked, it will have a number average molecular weight of at least 10 million and will preferably have a number average molecular weight of at least 50 million.

In the crosslinked resinous particle to be used in this invention, the $T_g$ should be not less than 30° C., while the upper limit of $T_g$ is about 200° C. The choice of the pre-crosslinked polymer utilized in the particles depends upon the operating temperature encountered during high-speed operation of the tire. It is critical for the pre-crosslinked polymer to have a $T_g$ temperature which is at least as high as the tire operating temperature which will be experienced during the high speed running of the tire. Higher $T_g$ values than about 200° C. are unnecessary because such temperatures are not likely to be reached even in the most extreme conditions of use, including high-speed racing. The crosslinked resinous polymer particles employed in this invention are typically made by an emulsion polymerization process that employs free radical initiation utilizing a free radical generator, such as an organic peroxide. Rubber produced by other polymerization methods may also be used as starting material for the production of resinous particles. The process can involve dispersing polymers in a liquid medium with surfactants by means of suitable apparatus at appropriate temperature, so that a dispersion of the polymers in the appropriate particle size range is obtained. The pre-crosslinked polymer will generally have a $T_g$ which is within the range of 50° C. to 180° C. and will preferably have a $T_g$ which is within the range of 80° C. to 150° C.

The nanoparticles can be crosslinked using a crosslinking monomer unit such as divinyl benzene, diisopropenylbenzene, divinylether, triallyl cyanurate, triallyl isocyanurate, 1,2-butadiene, ethyleneglycol dimethacrylate, propyleneglycol dimethacrylate, 1,4-butanediol dimethacrylate, 1,6-hexanediol dimethacrylate, trimethylolpropane dimethacrylate, or trimethylolpropane trimethacrylate. The crosslinking monomer is present in an amount of from 1% to about 50%, preferably about 1% to about 15%, by weight based upon the weight of the polymer. Crosslinking the particles can increase the hardness of the particle, as well as enhance the uniformity and permanence of the shape and size of the resultant nanoparticle.

According to this invention, it is particularly advantageous to incorporate in the rubber composition from 1 to 30 parts by weight, preferably from 2 to 20 parts by weight, and most preferably from 4 to 15 parts by weight, of the above particle per 100 parts by weight of the base polymer (phr). If the quantity of the particle is under 1 part by weight per 100 parts of the polymer base, it is inadequate to observe significant improvement on controllability, particularly road gripping, while above 30 parts by weight the beneficial effects on the grip of the tire are more than counterbalanced by the deterioration of the mechanical characteristics of the tread.

The rubber that can be used in practicing this invention include natural rubber and/or synthetic polydiene rubbers, selected from the group consisting of styrene butadiene rubber (SBR), butadiene rubber (BR), synthetic isoprene rubber (IR), isoprene butadiene rubber (IBR), acrylonitrile butadiene rubber (NBR), isobutylene polyisoprene rubber (IIR), chloroprene rubber (CR), styrene-butadiene-isoprene terpolymer, ethylene-propylene-diene terpolymer, either prepared in solution or in emulsion. In practicing this invention, such base polymers may be used either individually or mixed with one another, according to the desired characteristics of the finished product.

The amount of the rubber used is 70 to 99% by weight. When the amount is less than 70% by weight, the tensile strength, tensile stress and hardness at elevated temperatures are not improved. On the other hand, when the amount of the rubber component exceeds 99% by weight, not only the modulus of elasticity and hardness at room temperature but also the tensile strength, modulus of elasticity and hardness at elevated temperatures are not improved.

In the practice of this invention, conventional rubber compounding additives and ingredients can be included in the rubber compositions. Such additives include carbon black, silica, processing oil, sulfur, vulcanization accelerators, accelerator activators, antioxidants and the like.

The rubber compositions of this invention can be mixed and vulcanized utilizing conventional methods without the need for taking any extraordinary measures. For instance, ingredients for the rubber composition may be thoroughly mixed in a mixing machine such as rollers, a mill mixer, a Banbury mixer or the like and then vulcanized in the standard manner using a vulcanizing pan, a vulcanizing press, a curing mold or the like.

The rubber compositions for use in tires according to this invention are preferably used as a tread rubber and a sidewall rubber in high performance tires, particularly for, but not limited to, passenger cars and motorcycles, as well as tires for heavy vehicles such as construction vehicles and agricultural equipment. The rubber compositions for use in tires according to this invention can also be used in bias tires for heavy vehicles such as trucks and buses and they may be applied to other tire parts such as the bead portion and the like.

The pre-crosslinked polymer particles of this invention are typically synthesized by the emulsion polymerization of acrylate monomers, vinyl aromatic monomers, acrylonitrile monomer, and/or vinyl halide monomers. Generally, any vinyl aromatic monomer which is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, α-methylstyrene, 4-phenylstyrene, 3-methylstyrene and the like. The acrylate monomers that can be utilized are typically of the structural formula:

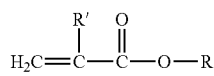

wherein R represents an alkyl group containing from 1 to 10 carbon atoms ($R=C_nH_{2n+1}$ with n being an integer from 1 to 8) and wherein R' represents a hydrogen atom or a methyl group ($R'=C_nH_{2n+1}$ with n being 0 or 1). In cases where R' is a methyl group, the acrylate monomer is an alkyl methacrylate monomer. Methyl methacrylate, ethyl methacrylate, propyl methacrylate and n-butyl methacrylate are representative examples of alkyl methacrylate monomers that can be used. The alkyl group in the acrylate monomer will preferably contain from 1 to 4 carbon atoms with alkyl groups which contain 4 carbon atoms being most preferred. Accordingly, methyl acrylate, ethyl acrylate, propyl acrylate and butyl acrylate are preferred alkyl propenoic acid ester monomers with butyl acrylate being the most preferred. The alkyl groups in such alkyl propenoic acid ester monomers can be straight chained or branched. Thus, normal-propyl acrylate, isopropyl acrylate, normal-butyl acrylate or tertiary-butyl acrylate can be employed. Normal-butyl acrylate is a particularly preferred monomer. Vinyl chloride is preferred for utilization as the vinyl halide monomer. The choice of monomers and ratio of monomers used in making the pre-crosslinked polymer particles will depend upon the properties desired for the pre-crosslinked polymer particles being made.

The emulsion polymerization can be conducted as a batch, semi-continuous, or continuous operation. Essentially any type of free radical generator can be used to initiate the free radical emulsion polymerization. For example, free radical generating chemical compounds, ultra-violet light or radiation can be used. In order to ensure a satisfactory polymerization rate, uniformity and a controllable polymerization, free radical generating chemical agents which are water-soluble or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3 -bis(t-butylperoxy) butyrate, 1,1-di-(t-butylperoxy)cyclohexane, and the like. Persulfate initiators, such as potassium persulfate and ammonium persulfate, are especially useful in such aqueous emulsion polymerizations.

The crosslinked particles utilized in the practice of this invention can also be synthesized with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred for use in generating free radicals.

The amount of free radical initiator employed will vary with the desired molecular weight of the crosslinked polymeric particles being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. A chain transfer agent, such as t-dodecyl mercaptan, can optionally be used to reduce the molecular weight of the polymer synthesized during the emulsion polymerization used to make the particle. For instance, the molecular weight of the particle reduces with increasing levels of chain transfer agent. However, it is not necessary to utilize a chain transfer agent in the synthesis of the particle.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

All of the soap is typically charged into the first polymerization zone. The total amount of soap employed will normally be less than 5 phm. The quantity of soap employed will normally be within the range of about 1 phm to 4 phm. It is typically preferred to utilize a level of soap which is within the range of about 2 phm to about 3.0 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. (2° C.) to about 200° F. (93° C.). It is generally preferred for the polymerization to be carried out at a temperature which is within the range of 100° F. (38° C.) to about 170° F. (77° C.). It is typically more preferred to utilize polymerization temperature which is within the range of about 115° F. (46° C.) to about 130° F. (54° C.). To increase conversion levels, it can be advantageous to increase the temperature as the polymerization proceeds.

After the polymerization has been terminated the pre-crosslinked polymer particles are typically recovered from the aqueous medium. This can be accomplished by coagulating the latex and recovering the particles from the aqueous medium. The coagulation can be accomplished by adding an acid or preferably a combination of salts and an acid to the emulsion. Following the initial coagulation, the pre-crosslinked polymer particles can be washed one or multiple times with water solution.

After the polymer particles are recovered from the emulsion, it will be dried to remove residual water from the aqueous polymerization medium. This will typically be done by heating the polymer in a stream of warm dry air or by heating the polymer under vacuum to remove any water present. The preferred technique is spray drying. In general, one may spray dry the polymer by forcing the solution at high pressures through a nozzle. The solution may be sprayed onto a surface or sprayed such that the droplets dry in midair. Any appropriate type of spray may be used for this purpose, especially turbine, nozzle, liquid pressure diffuses or dual fluid sprays.

The pre-crosslinked polymer particles are then blended into one or more rubbery polymers as desired. As has been pointed out, this is typically accomplished in a Banbury mixed or a mill mixer.

In an alternative embodiment of this invention, the latex of the pre-crosslinked polymer particles is blended with the latex of one or more rubbery polymers and co-coagulated. This technique eliminates the need to separately isolate the pre-crosslinked polymer particles and can be utilized to attain a homogeneous mixture of the pre-crosslinked polymer particles throughout the rubber composition.

In any case, the rubbery polymers of this invention can be compounded utilizing conventional ingredients and standard techniques. For instance, such rubber blends will typically be mixed with carbon black and/or silica, sulfur, fillers, accelerators, oils, waxes, scorch inhibiting agents and processing aids. In most cases, the rubber blend will be compounded with sulfur and/or a sulfur-containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur-containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases, at least some carbon black will be utilized in the filler. The filler can, of course, be comprised totally of carbon black. Silica and/or organic fillers such as starch can be included in the filler to improve tear resistance and heat buildup. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The rubber blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 2 phr of scorch inhibiting agents.

The rubber compositions of the present invention can be used as a tire treadstock, sidewall stock or other tire component stock compounds. In a tire of this invention, at least one such component is produced from a vulcanizable elastomeric or rubber composition. For example, the pre-crosslinked polymer particles of this invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), isoprene-butadiene rubber (IBR), styrene-isoprene-butadiene rubber (SIBR), polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber, and the like.

The rubber compositions of this invention can be compounded with carbon black in amounts ranging from about 5 to about 100 phr (parts by weight per 100 parts by weight of rubber), with about 5 to about 80 phr being preferred, and with about 40 to about 70 phr being more preferred. The carbon blacks may include any of the commonly available, commercially-produced carbon blacks but those having a surface area (EMSA) of at least 20 m²/g and more preferably at least 35 m²/g up to 200 m²/g or higher are preferred. Surface area values used in this application are those determined by ASTM test D-1765 using the cetyltrimethylammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| Carbon Black | |
|---|---|
| ASTM Designation (D-1765-82a) | Surface Area (D-3765) |
| N-110 | 126 m²/g |
| N-220 | 111 m²/g |
| N-330 | 83 m²/g |
| N-339 | 95 m²/g |
| N-550 | 42 m²/g |
| N-660 | 35 m²/g |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of suitable vulcanizing agents one can refer to Kirk-Othmer, Encyclopedia of Chemical Technology, 3rd ed., Wiley Interscience, N.Y. 1982, Vol. 20, pp. 365-468, particularly "Vulcanization Agents and Auxiliary Materials" pp. 390-402. Vulcanizing agents can, of course, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

It will frequently be advantageous to include silica in the tread rubber formulation made with the rubbery polymers of this invention. The processing of the rubbery elastomer is normally conducted in the presence of a sulfur-containing organosilicon compound (silica coupler) to realize maximum benefits. Examples of suitable sulfur-containing organosilicon compounds are of the formula:

Z-Alk-S$_n$-Alk-Z    (I)

in which Z is selected from the group consisting of:

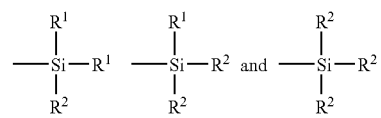

where $R^1$ is an alkyl group of 1 to 4 carbon atoms, cyclohexyl or phenyl; wherein $R^2$ is an alkoxy group containing 1 to 8 carbon atoms or a cycloalkoxy group containing 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3 '-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3 '-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur-containing organosilicon compounds are the 3,3'-bis(trimethoxy or triethoxy silylpropyl)sulfides. The most preferred compound is 3,3'-bis(triethoxysilylpropyl)tetrasulfide. Therefore, as to Formula I, preferably Z is

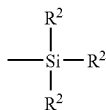

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica.

In addition to the sulfur-containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black; namely, pre-mixed with a carbon black prior to addition to the rubber composition and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The pre-crosslinked polymer particle containing tire tread compounds of this invention can be used in tire treads in conjunction with ordinary tire manufacturing techniques. Tires are built utilizing standard procedures with the emulsion SBR of this invention being substituted for the rubber compounds typically used as the tread rubber. After the tire has been built with the emulsion SBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

In these examples, a rubber composition was prepared according to a compounding recipe as shown in the following Table 1.

TABLE 1

|  | Part by weight (phr) |
|---|---|
| S-SBR* | 100 |
| Resinous particle | 5 |
| Carbon black | 60 |
| ZnO | 3 |
| Stearic acid | 3 |
| Antioxidants | 2 |
| Process aids | 20 |
| Non-productive* | 193 |
| Sulfur | 0.5 |
| Accelerators | 1.8 |
| Productive* | 195.3 |

*S-SBR is styrene-butadiene copolymer prepared in solution. Non-productive is the compounded material without any curative agents added. The material may be heated and mixed to higher temperatures without beginning the vulcanization process. Productive is the non-productive material with the curative added.

Example 1

Preparation of Crosslinked Polymethyl Methacrylate Particle

A glass quart bottle with a rubber septum and Teflon liner was charged with a soap solution composed of 421.63 grams of reverse osmosis (RO) water, 9.57 grams of a 23% solution of dodecyl benzene sulfonic acid sodium salt. The pH of the soap solution was adjusted to 10.5-11.0 with a 20% potassium hydroxide solution.

Then, 198.00 grams of methyl methacrylate and 2.20 to 22.00 grams of ethyleneglycol dimethacrylate (abbreviated as EGDMA) were added to the bottle and the mixture was purged with nitrogen gas for 3 minutes to remove oxygen. The bottle was sealed. The sealed bottle was placed in a 50° C. water bath and rotated at 20 revolutions per minute. When the contents of the bottle reached the bath temperature, 0.33 grams of potassium persulfate was added. The reaction was allowed to proceed until the solids content reached a plateau of 33% solids. The particle size was determined by light scattering and fit to a Gaussian distribution. The particle sizes determined were: Intensity Weight average 160±40 nm, Volume Weight average 100±30 nm, and Number Weight average 90±30 nm. If a core-shell structure is needed, a second monomer will be added into the bottle to form a shell around the particle.

The coagulation and isolation of the polymer particles were performed by adding 15 grams of NaCl to 5 lbs (2.27 kg) of RO water. The pH of the solution was lowered to between 3 and 4 with an 18% sulfuric acid solution. The latex was slowly added to the coagulation solution under rapid stirring. During the addition of latex, the pH was maintained between 3 and 4. After coagulation the paste polymer was washed 3 times with RO water and placed in a 65° C. oven with circulating air to dry.

Example 2

Preparation of the Compounded Mixture

Mixing of the particle/polymer blends was accomplished in two stages according to the recipe listed in Table 1. The first stage (non-productive) involved adding all the polymer to a 55 cc Haake Rheomix 90 equipped with a throat, with all the temperature control zones set at 145° C., Banbury rotors, and a mixing rate of 40 rpm. After the polymer is added to the mixer, the other ingredients of the non-productive except the oil are added. Then oil was added. The ram was lowered and the material was mixed for 7 minutes ensuring that the temperature did not exceed 160° C.

The productive mix was run under the same conditions except that the temperature zones of the mixer were controlled at 90° C. One-half of the mixed non-productive material was added to the mixer followed by the productive ingredients, and the second half of the non-productive. The ram was lowered and the material was mixed for 1.5 minutes with the temperature not to exceed 100° C.

After the productive mix was completed, the samples were passed six times endwise through a mill set at 0.032 in. in order to create a sheet.

Example 3

Compounded Properties

According to the procedure described in Example 2, rubber compositions were prepared with the addition of different resinous particles listed in Table 2. Both mechanical and dynamic properties were measured and compared with the compound without resinous particles (Comp. Ex. 1) in Table 2.

TABLE 2

|  | Ex. A | Ex. B | Ex. C | Comp. Ex. 1 |
|---|---|---|---|---|
| Tg (° C.) | 125 | 140 | 75 | — |
| 100% modulus, Mpa (100° C.) | 0.68 | 0.66 | 0.58 | 0.60 |
| 200% modulus, Mpa (100° C.) | 1.14 | 1.07 | 1.04 | 1.00 |
| 300% modulus, Mpa (100° C.) | 1.91 | 1.75 | 1.91 | 1.68 |
| Tanδ at 100° C. | 0.236 | 0.227 | 0.227 | 0.205 |
| Tanδ at 130° C. | 0.225 | 0.206 | 0.200 | 0.178 |
| J" at 100° C., $10^{-8}$ 1/Pa | 2.01 | 2.41 | 2.15 | 1.75 |
| J" at 130° C., $10^{-8}$ 1/Pa | 2.33 | 2.61 | 2.36 | 1.79 |

Ex. A = polymethyl-methacrylate (abbreviated as PMMA) particle with 1% crosslinking monomer EGDMA;
Ex. B = PMMA particle with 10% EGDMA;
Ex. C = particle of PMMA core with polystyrene shell;
Comp. Ex. 1 = no resinous particle.

The tests were carried out on strip-shaped test samples having width of 6.3±0.05 mm, a thickness of 0.5±0.05 mm and a working length of 20±1 mm, which were torsion stressed with an amplitude equal to 0.1% and a frequency of 1 Hz.

The test sample was subjected to a temperature sweep at a heating speed equal to 3° C. per minute with a range of −50° C. to 150° C. The results of the tests carried out are graphically shown in FIG. 1, wherein loss compliance J" (1/Pa) is plotted as function of temperature (° C.).

As apparent from the data of Table 2, the rubber compositions of Ex. A to C containing resinous particles with high $T_g$ did not deteriorate the modulus of elasticity at elevated temperature (100° C.) as compared with the rubber composition of Comp. Ex. 1 containing no resinous particle. In addition, the hysteresis loss, both tanδ and J", were significantly increased by adding high $T_g$ particles.

Example 4

Mechanical Properties

According to the procedure described in Example 2, rubber compositions were prepared with the addition of different resinous particles listed in Table 3.

TABLE 3

|  | Ex. B | Comp. Ex. 2 | Comp. Ex. 1 |
| --- | --- | --- | --- |
| Resin type | PMMA particle crosslinked with 10 wt % EGDMA | linear PMMA polymer | — |
| Tg (° C.) | 140 | 120 | — |

The compounds were milled to provide a sheet of the material. Approximately 5 g of the compound was cut from the sheet. Each sample should weigh 5.1±0.1 g. The data was collected on RPA 2000 using standard test method #505. The test method was divided up into six subtests. The first subtest was conducted at 100° C. with a 2% strain deformation and at 0.333 Hz and 3.33 Hz. The second subtest was also made at 100° C. and employed a 15% strain at 0.833 and 8.33 Hz. The third subtest was a cure at 191° C. for a run time of 4.88 minutes. The cure curve was generated for a strain of 3.5% at a frequency of 1.667 Hz. Subtests 4 to 6 were a strain sweep (0.3%, 1.0% and 5.0%) at 1.0 Hz, at 70° C., 100° C. and 130° C., respectively. G' at 5.0% strain vs. temperature data from subtest 4 to 6 were plotted in FIG. 1.

FIG. 1 compares the change of elastic modulus with temperature for compound with crosslinked particle (Ex. B) as to compound with linear resinous polymer (Comp. Ex. 2) and compound containing no resinous particle or polymer (Comp. Ex. 1). Both Ex. B and Comp. Ex. 2 show an increase of elastic modulus (G') compared with Comp. Ex. 1. However, it has been found that the addition of crosslinked particle has no effect on the change of elastic modulus as temperature increases. The magnitude of G' change with the change of temperature is similar to Comp. Ex. 1. On the other hand, adding linear resinous polymer without crosslinked structure (Comp. Ex. 2) caused G' decreases more rapidly as temperature increased from 70° C. to 130° C. As mentioned above, we consider this as the drawback of adding resinous polymers. The dramatic change of elastic modulus with temperature is caused by the break down of resinous polymer domains near the transition temperature of the resinous polymers, which is undesirable for tire tread materials subjected to severe thermal mechanical stresses during high-speed running. The point of this invention is that by introducing crosslinked structure, the integrity of the particle domains is maintained, so that the problem can be overcome.

Example 5

Dynamic Properties

Figure 2:
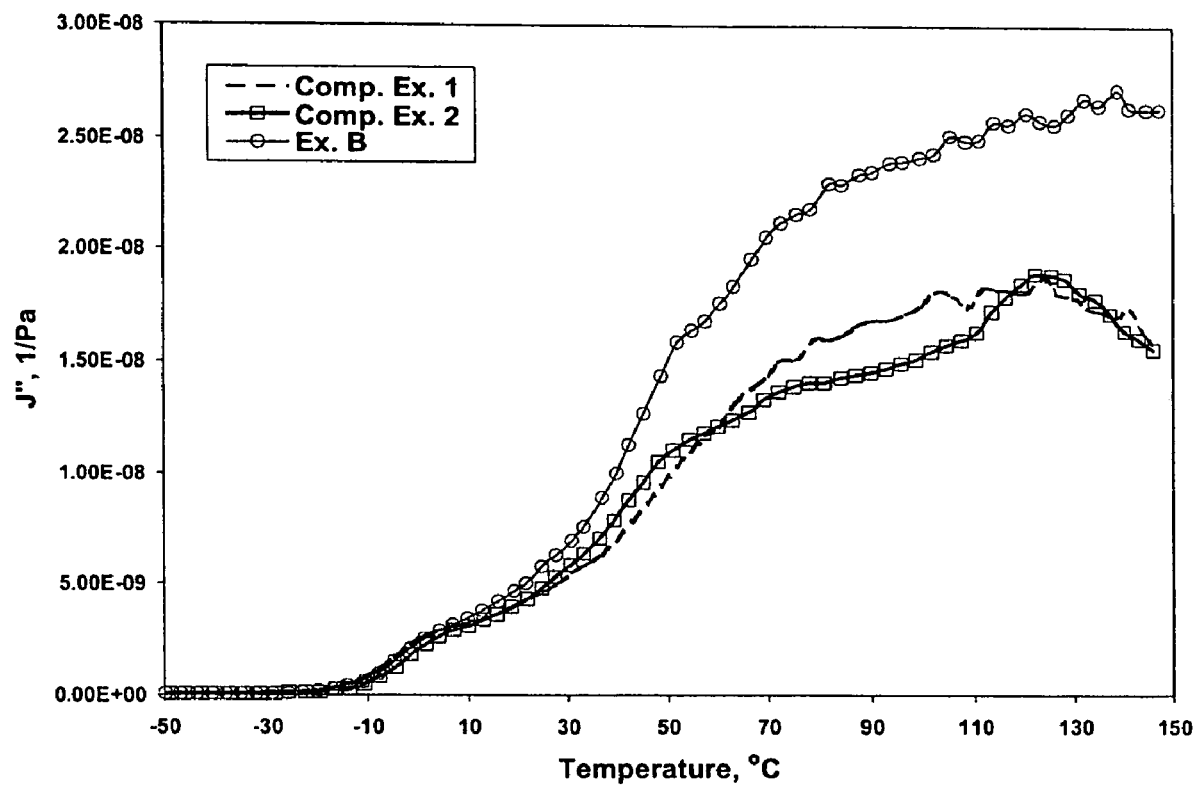
FIG. 2 shows the values of loss compliance (J"), defined as: $J''=G''/(G'^2+G''^2)$, wherein: G": loss modulus [Pa], G': elastic modulus [Pa], as a function of the temperature of a preferred rubber composition of this invention in comparison with two other comparative rubber compositions.

As mentioned in background of the invention, J" is considered as an indicator for overall handling performance. FIG. 2 shows the hysteresis loss (J") as function of temperature for the rubber compositions listed in Table 3.

From FIG. 2, it is found that the value of J" from Ex. B remains substantially constant over the temperature range from 70 to 150° C., which is considered as borderline conditions tires are subjected to when running at high speed. In addition, the values of J" are significantly higher in Ex. B compared with Comp. Ex. 1 and 2 above 50° C. On the other hand, J" of the rubber composition containing linear resinous polymer without crosslinking structure (Comp. Ex. 2) shows no advantage in both magnitude and stability. In fact, the spike of J" around the transition temperature of the resinous polymer presents the disadvantage of adding uncrosslinked resinous polymers, in that handling stability is reduced. As a result, by adding resinous particles internally crosslinked, our invention provides a method to both improve road grip, controllability and maintain handling stability during high-speed running.

While certain representative embodiments and details have been shown for the purpose of illustrating the subject invention, it will be apparent to those skilled in this art that various changes and modifications can be made therein without departing from the scope of the subject invention.

What is claimed is:

1. A tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; and wherein the tread is comprised of a rubber composition comprising: (1) a rubbery polymer; (2) from 1 to 30 parts per hundred parts of rubber by weight of pre-crosslinked polymer particles, wherein the pre-crosslinked polymer particles have a mean number average particle size as determined by light scattering which is within the range of 30 nm to 500 nm, wherein the pre-crosslinked polymer is comprised of repeat units that are derived from at least one monomer selected from the group consisting of acrylate monomers, acrylonitrile monomer, and vinyl halide monomers, wherein the pre-croslinked polymer is in the form of core-shell particles having a core and a shell, and wherein the pre-crosslinked polymer has a glass transition temperature which is within the range of 30° C. to 200° C.; and (3) 10 to 150 parts per hundred parts of rubber by weight of at least one filler selected from the group consisting of carbon black and silica.

2. A tire as specified in claim 1 wherein the pre-crosslinked polymer is further comprised of repeat units that are derived from a crosslinking monomer.

3. A tire as specified in claim 2 wherein the crosslinking monomer is incorporated into the pre-crosslinked polymer at a level which is within the range of 1 weight percent to 30 weight percent, based upon the total weight of monomers incorporated into the pre-crosslinked polymer.

4. A tire as specified in claim 3 wherein the pre-crosslinked polymer is present in the rubber composition at a level which is within the range of 2 to 20 parts per hundred parts of rubber by weight.

5. A tire as specified in claim 3 wherein the pre-crosslinked polymer is present in the rubber composition at a level which is within the range of 4 to 15 parts per hundred parts of rubber by weight.

6. A tire as specified in claim 4 wherein the pre-crosslinked polymer is in the form of particles having a mean number average particle size as determined by light scattering which is within the range of 40 nm to 250 nm.

7. A tire as specified in claim 5 wherein the pre-crosslinked polymer is in the form of particles having a mean number average particle size as determined by light scattering which is within the range of 100 nm to 200 nm.

8. A tire as specified in claim 6 wherein the pre-crosslinked polymer is in the form of particles that are essentially spherical in shape.

9. A tire as specified in claim 6 wherein the pre-crosslinked polymer includes repeat units that are derived from acrylonitrile.

10. A tire as specified in claim 9 wherein the pre-crosslinked polymer is further comprised of repeat units that are derived from a conjugated diolefin monomer.

11. A tire as specified in claim 6 wherein the pre-crosslinked polymer includes repeat units that are derived from an acrylate monomer.

12. A tire as specified in claim 11 wherein the pre-crosslinked polymer is further comprised of repeat units that are derived from a conjugated diolefin monomer.

13. A tire as specified in claim 6 wherein the pre-crosslinked polymer includes repeat units that are derived from a vinyl halide monomer.

14. A tire as specified in claim 13 wherein the pre-crosslinked polymer is further comprised of repeat units that are derived from a conjugated diolefin monomer.

15. A tire as specified in claim 2 wherein the crosslinking monomer is selected from the group consisting of divinyl benzene and ethylene glycol dimethacrylate.

16. A tire as specified in claim 1 wherein the polymer in the core is crosslinked.

17. A tire as specified in claim 1 wherein the polymer in the shell is crosslinked.

18. A tire as specified in claim 11 wherein the acrylate monomer is methyl methacrylate.

19. A tire as specified in claim 1 wherein the filler is carbon black.

20. A tire as specified in claim 1 wherein the filler is silica and wherein the rubber composition is further comprised of a silica coupling agent.

* * * * *